(12) United States Patent
Wiebe

(10) Patent No.: US 6,698,738 B2
(45) Date of Patent: Mar. 2, 2004

(54) MULTI-DIRECTION SWIVEL VISE

(76) Inventor: David Wiebe, 715 4th St., David City, NE (US) 68632

(*) Notice: Subject to any disclaimer, the term of this patent is extended or adjusted under 35 U.S.C. 154(b) by 0 days.

(21) Appl. No.: 10/366,804

(22) Filed: Feb. 14, 2003

(65) Prior Publication Data

US 2003/0151184 A1 Aug. 14, 2003

Related U.S. Application Data

(60) Provisional application No. 60/356,921, filed on Feb. 14, 2002.

(51) Int. Cl.[7] ................................................. B23Q 1/04
(52) U.S. Cl. ........................................................ 269/75
(58) Field of Search .............................. 269/75, 45, 71, 269/81–83, 20; 248/181.1, 288.3, 481.1, 483, 183.3

(56) References Cited

U.S. PATENT DOCUMENTS 1,981,253 A * 11/1934 Schulz .......................... 269/75

* cited by examiner

Primary Examiner—Robert C. Watson
(74) Attorney, Agent, or Firm—Adam H. Jacobs

(57) ABSTRACT

A multi-position swivel vise includes a base structure and a generally spherical vise ball which is movably and rotatably supported on the base structure. A crown is mounted on the base structure above the vise ball, and a jack device such as an hydraulic jack is mounted on the base structure below the vise ball, the jack device operative to elevate the vise ball into a contact position in contact with the crown such that the vise ball is releasably immobilized via frictional contact with the crown.

9 Claims, 3 Drawing Sheets

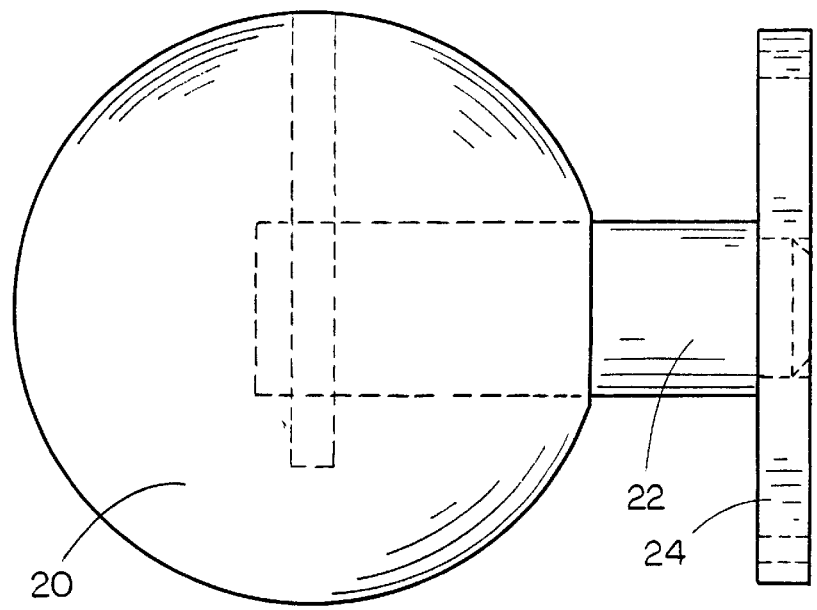
FIG. 3A
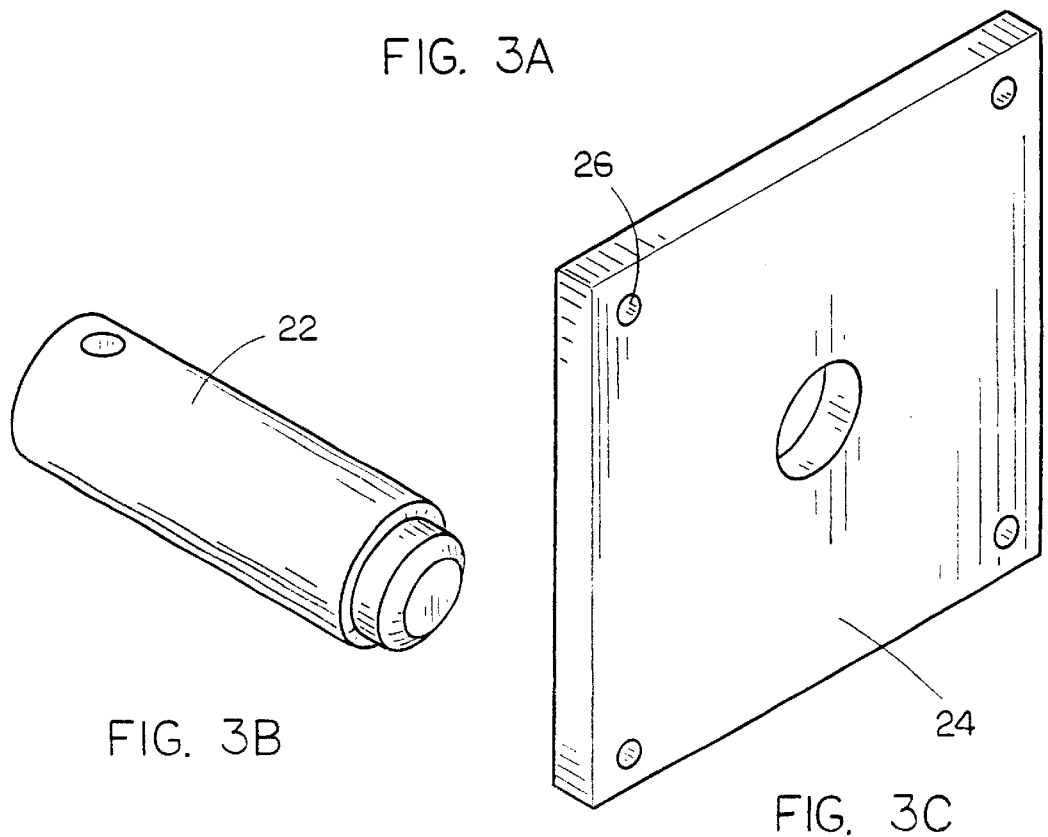
FIG. 3B
FIG. 3C

MULTI-DIRECTION SWIVEL VISE

CROSS-REFERENCE TO RELATED
PROVISIONAL PATENT

This application claims priority based on a provisional patent, specifically on the Provisional Patent Application Ser. No. 60/356,921 filed Feb. 14, 2002.

BACKGROUND OF THE INVENTION

1. Technical Field

The present invention is directed to swivel vises in the manufacturing industry and, more particularly, to a multi-positional swivel vise having a support plate mounted to the floor, four telescoping legs, a shoulder section which supports the ball joint having a crown, ball and gripping ring, an attachment plate that securely attaches to the desired object and is mounted atop the ball via the use of a shaft that is inserted into the ball, a hydraulic jack that elevates the ball into the gripping ring in the desired orientation, and an actuating device that controls the hydraulic jack.

2. Description of the Prior Art

There are numerous types of vises found in the prior art which are designed for use in many different situations. The standard type of vise is one in which a pair of jaws are moved towards or away from each other to releasably secure an object therebetween. However, to reposition the object in the vise, one must release the jaws and reset the object, which is time-consuming and may not be practical depending on the object being supported.

For this reason, adjustable vises were developed which permitted the repositioning of the object without releasing the vise jaws. Some of these vises included ball joints and swivels that permitted the positioning of the object in many different orientations. However, the sophisticated nature of the securement systems of these vises often resulted in an actual increase in the amount of time spent adjusting the positioning of the object.

There is therefore a need for a vise which will permit repositioning of the object supported thereon without requiring a major expenditure of time and effort, yet one which will safely support the object in the desired position.

Many ball joint-type vises include clamping mechanisms for preventing rotation and movement of the ball, but these clamping mechanisms are dependent on the strength, of the operator to tighten the clamping mechanism sufficiently to prevent movement of the ball. This is particularly evident when a heavy object is being supported on the vise, and what often occurs is that the vise "slips" and the object must be repositioned. There is therefore a need for a ball joint-type vise which does not rely on the strength of the operator to secure the supported object in a particular orientation.

Therefore, an object of the present invention is to provide an improved multi-directional swivel vise for supporting objects in a particular work orientation.

Another objective of the present invention to provide a multi-directional swivel vise which includes a base structure on which is rotatably supported a vise ball, a crown positioned above the vise ball, and a jack device for elevating the vise ball into frictional contact with the crown to releasably secure the vise ball in a particular orientation.

Another objective is to provide a multi-directional swivel vise which is capable of supporting large heavy objects thereon.

Another objective is to provide a multi-directional swivel vise in which the orientation of the supported object may be quickly and easily changed.

Finally, an object of the present invention is to provide a multi-directional swivel vise which is relatively simple to manufacture and which is safe and durable in use.

SUMMARY OF THE INVENTION

The present invention provides a multi-position swivel vise which includes a base structure and a generally spherical vise ball movably and rotatably supported on the base structure. A crown is mounted on the base structure above the vise ball, and a jack device such as an hydraulic jack is mounted on the base structure below the vise ball, the jack device operative to elevate the vise ball into a contact position in contact with the crown such that the vise ball is releasably immobilized via frictional contact with the crown.

The multi-position swivel vise thus described clearly offers several advantages over those devices found in the prior art. The relatively simple design and easy use characteristics of the present invention permit the user to quickly mount objects on the vise and move them into desired position for work thereon. Also, because the vise ball is moved upwards into contact with the crown to secure the vise ball in a chosen position, there is less likelihood of slippage of the ball due to the multiple frictional contact points, thus permitting the use of the present invention with even large heavy objects. Furthermore, because the vise ball and jack are the only moving elements of the invention, there is much less likelihood of the invention breaking down and becoming non-functional. The present invention thus provides a substantial improvement over those vises found in the prior art.

BRIEF DESCRIPTION OF THE DRAWINGS

FIGS. 3a, 3b and 3c are detail elevational views of the vise ball and mounting plate of the present invention.

DESCRIPTION OF THE PREFERRED
EMBODIMENT

Figure 2:
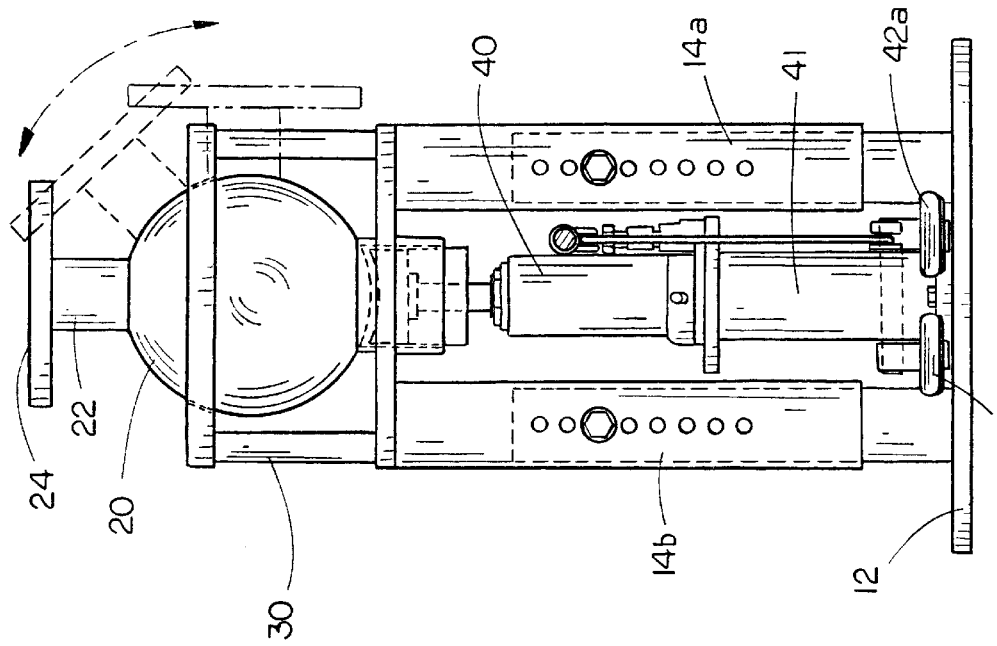
FIG. 2 is a front elevational view of the preferred embodiment of the present invention.
Figure 1:
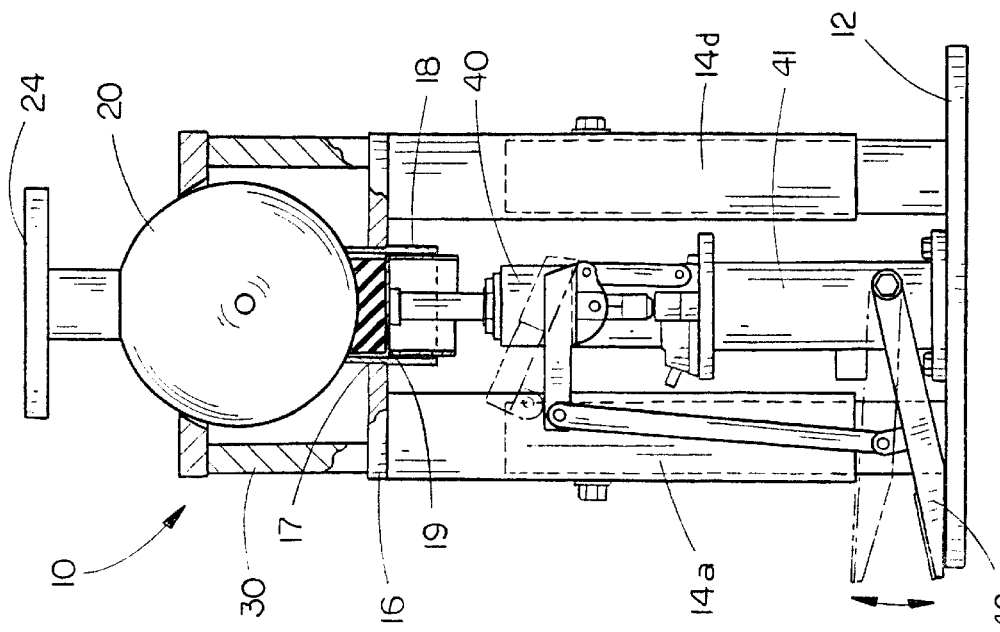
FIG. 1 is a side elevational view of the preferred embodiment of the present invention.

The multi-directional swivel vise 10, as best seen in FIGS. 1 through 4, includes a generally square support base 12 having dimensions of approximately ten to twenty-five inches (10"–25") per side which is preferably mounted to the floor via a plurality of bolts that are inserted through pre-drilled holes (not shown) in the support base 12. Although using bolts to secure the support base 12 to the floor is not critical to the inventive characteristics of the present invention, it has been found that, due to the heavy duty components and uses for which this invention is intended to be utilized, it is preferable to bolt the invention to the floor thus providing additional stability. Welded to and extending upward from the support base 12 are four telescoping legs 14a, 14b, 14c and 14d that, in the preferred embodiment as best seen in FIGS. 1 and 2, are generally square tubes in cross-sectional shape and are approximately three feet (3') in height. The telescoping legs 14a–d provide support for the upper portion of the invention, which will be detailed in this disclosure, and allow the user to adjust the height of the swivel vise 10 which has been found to be useful when working with materials of various shapes and sizes that are mounted to the swivel vise 10 and to accommodate different sizes and designs of the hydraulic ram.

Located directly atop and welded to the telescoping legs 14 is generally flat square shoulder plate 16 that is preferably constructed of steel plate and has dimensions of approximately one inch (1") in thickness and ten to twenty-five inches (10–25") in length per side. The shoulder plate 16 of the current invention is designed and manufactured to withstand the substantial forces that are generated during use of the present invention although the exact dimensions and construction materials of the shoulder plate 16 are not critical so long as it retains the ability to function as will be described herein.

Formed in the approximate center of the shoulder plate 16 is a center hole 17 which is an approximately four to six inch (4–6") in diameter hole. Mounted within center hole 17 is a ball support cylinder 18 which would have a height of approximately four inches (4") and extends above the center hole 17 approximately one inch (1") or so. Rotatably supported by ball support cylinder 18 is a vise ball 20 which, in the preferred embodiment as best seen in FIGS. 1 and 2, is a sturdily constructed sphere of urethane or metal having a diameter of approximately ten to eighteen inches (10–18"). The vise ball 20 sits within the ball support cylinder 18 and is prevented from falling through the ball support cylinder 18 as the diameter of the ball support cylinder 18 is less than the diameter of the vise ball 20. The ball support cylinder 18 holds and centers the vise ball 20 on the shoulder plate 16 to allow the operator to rotate the vise ball 20 in place and allows the passage of a hydraulic jack 40 through the ball support cylinder 18 which elevates the vise ball 20 as will be described in detail in this disclosure. The exact shape and size of the ball support cylinder 18 and vise ball 20 are not critical so long as the ball support cylinder 18 and vise ball 20 retain the rotational and securement functions intended in the present invention.

Mounted on and extending outwards from the vise ball 20 is a steel shaft 22, which, in the preferred embodiment, would have a diameter of approximately two and one-half inches (2½") and a length of approximately three to five inches (3"–5"). In the preferred embodiment, the shaft 22 would be inserted into the vise ball 20 as can best be seen in FIGS. 3a–3c. To prevent free rotation of the shaft 22 within the vise ball 20 during use, a pin (not shown) or the like may be inserted through the vise ball 20 at an angle perpendicular to the shaft 22, the pin engaging the shaft and securing the shaft 22 within the vise ball 20. However, it is understood that many devices and methods may be used to secure the shaft 22 within the vise ball 20 such as the use of epoxies, cements, glues, or the shaft 22 could be manufactured with the vise ball 20 as a single unit.

Mounted on the shaft 22 and adapted for rotational movement in unison with the vise ball 20 is an attachment plate 24 which, in the preferred embodiment, is generally square and would have dimensions of approximately twelve inches (12") on each side and approximately one-half inch (½") thick. As best seen in FIG. 3b, the attachment plate 24 has four (4) holes 26 drilled at the approximate corners of the plate 24 through which the operator could insert screws or bolts (not shown) for securing an object to the attachment plate 24. Of course, many different types of objects may be secured to the attachment plate 24 and the operator may manipulate the object into the desired position by simply rotating the object and the ball 20 will rotate within the ball support cylinder 18. Although the preferred embodiment presents one method by which objects may be mounted to the attachment plate 24, many alternative mounting methods can be utilized to accomplish the same function as the holes 26 such as using c-clamps (not shown) or certain adhesive materials (not shown). Finally, it should be noted that the vise ball 20 and attachment plate 24 are rotatable through substantially ninety degrees (90°) such that an object mounted on the attachment plate 24 can be worked on in a virtually unlimited number of orientations and positions, which is a substantial improvement over the prior art.

Figure 4:
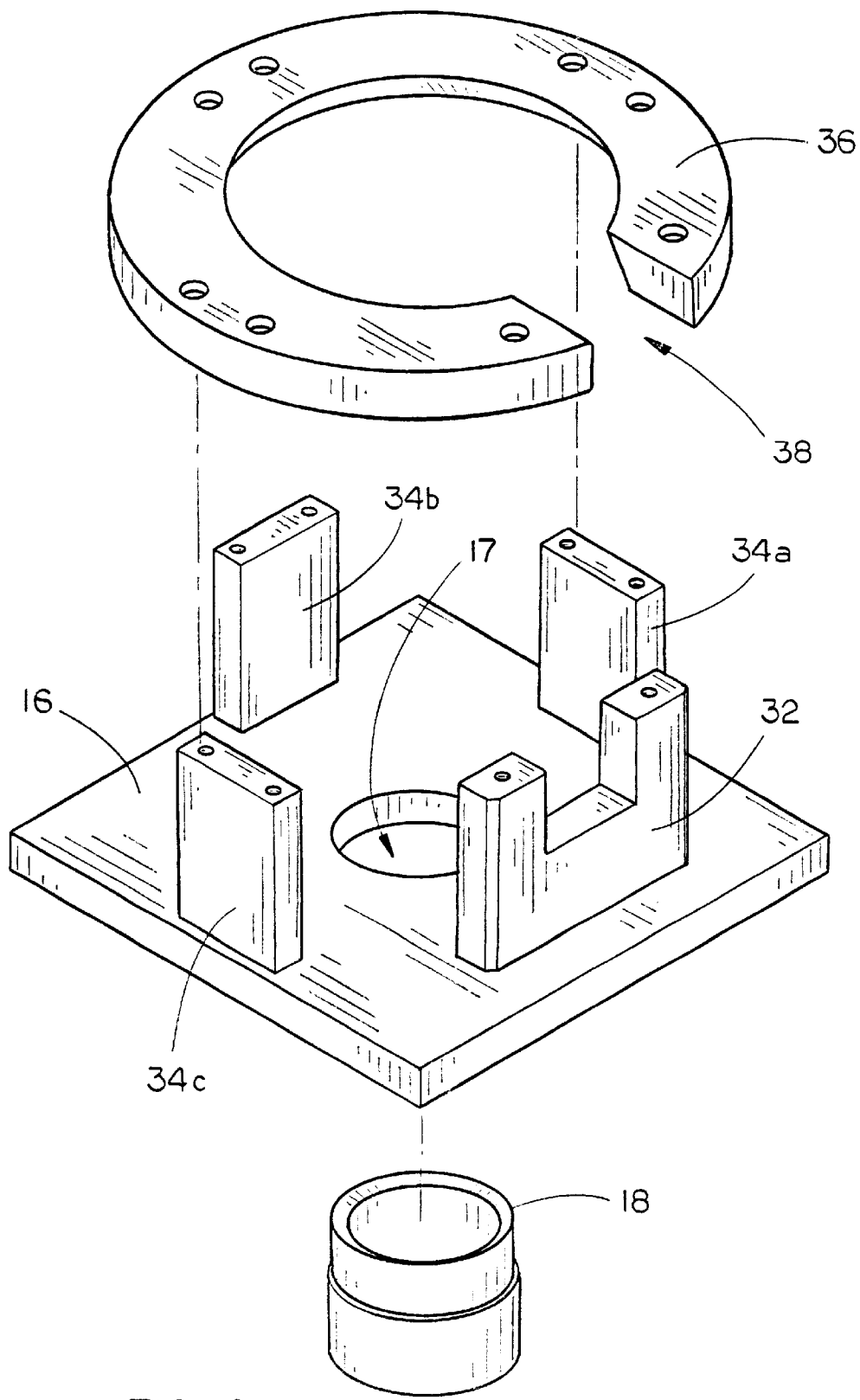
FIG. 4 is an exploded perspective view of the crown of the present invention.

To releasably secure the vise ball 20 in a fixed orientation during use, the present invention includes a circumferential crown 30 which is mounted to and above the shoulder plate 16. The crown 30 releasably secures the vise ball 20 in a fixed orientation during use, thus preventing the object mounted to the attachment plate 24 from moving. In the preferred embodiment, as best seen in FIGS. 1, 2 and 4, the crown 30 consists of the following elements: a generally U-shaped support strut 32 that is preferably constructed of steel and is approximately six to ten inches (6"–10") high, approximately six to ten inches (6"–10") wide, and approximately one inch (1") thick; three (3) generally rectangular support struts 34a, 34b and 34c that are six to ten inches (6–10") high, approximately four to six (4–6") wide, and one inch (1") thick; and a gripping ring 36 mounted atop each of the U-shaped support strut 32 and three (3) generally rectangular support struts 34a, 34b and 34c, the gripping ring 36 being a sectioned ring extending approximately 300°–330° in circumference, having a inner diameter of approximately five to ten inches (5"–10") and having a gap 38 through which the shaft 22 of the vise ball 20 can be rotated downwards. The gripping ring 36 substantially encircles the vise ball 20 at a height approximately three-fourths of the height of the vise ball 20, as best seen in FIG. 1. Although the preferred embodiment contemplates approximately one U-shaped support strut 32 and three rectangular support struts 34a, 34b and 34c, struts of different sizes and shapes could be used to secure the gripping ring 36 on the shoulder plate 16 which are within the scope of the present invention.

As can be seen in FIG. 1, the U-shaped support strut 32, the rectangular support struts 34a, 34b and 34c and the gripping ring 36 generally encapsulate the vise ball 20 in a segmented circumferential housing which prevents movement of the vise ball 20 except in rotation thereof. Therefore, it is clear how the vise ball 20 can be freely rotated, but it is the cessation of rotation of the vise ball 20 which is an important feature of the present invention, and the simplicity with which ball rotation is controlled renders the present invention superior to the vises found in the prior art.

As can be seen in FIGS. 1 and 4a–c, the inner face 40 of sectional gripping ring 36 is angled and may be curved to contact the vise ball 20 on the surface thereof. After the operator has oriented the object mounted to the attachment plate 24 into the desired position, the operator uses a hydraulic jack 40 to raise the vise ball 20 out of the ball support cylinder 18 upward against the gripping ring 36. In the preferred embodiment, a ball cradle 19 is slidably mounted within the ball support cylinder 18, the ball cradle 19 including an upper surface constructed of a frictional material such as a plastic or rubber which frictionally secures the vise ball 20 thereon, and a lower surface constructed of metal or the like which is engaged by the hydraulic jack 40 which moves the ball cradle 19 upwards within ball support cylinder 18. As the ball cradle 19 is moved upwards by the hydraulic jack 40, the upper surface of the ball cradle 19 engages the underside of the vise ball 20 and moves the vise ball 20 upwards towards the gripping ring 36. The inner face 40 of the gripping ring 36 and the surface of vise ball 20 frictionally engage one another, and due to the construction materials used and the force applied by the hydraulic jack 40, this frictional force is very large and prevents rotation of the vise ball 20 within the crown 30.

Any object mounted on the attachment plate 24 is thus held in the desired location and the operator need not worry about the object moving without his or her consciously choosing to release the vise ball 20 and permit movement of the object. In the preferred embodiment, the hydraulic jack 40 is located underneath the vise ball 20 and is mounted on the support base 12 on a pedestal 41 between the telescoping legs 14 and has at least one actuating foot pedal 42a operatively connected to it. Upon the operator stepping on the actuating foot pedal 42a, the hydraulic jack 40 extends thus elevating the vise ball 20 into frictional engagement with the gripping ring 36 thereby securing and preventing the ball 20 from moving within the crown 30. The operator would then engage a release pedal 42b to lower the hydraulic jack 40 and permit rotation of the vise ball 20 within the crown 30. Of course, it should be noted that a pneumatic ram, mechanical jack or the like may be substituted for the hydraulic jack 40 of the present invention so long as the functional characteristics of the present invention are maintained.

Further, it is to be understood that numerous modifications, additions and substitutions may be made to the present invention which fall within this broad disclosure. For example, the construction materials used in, and the method for assembling, the swivel vise 10 may be modified and/or changed so long as the invention maintains the ability to correctly function and rotatably support objects mounted thereon. Additionally, the size and shape of the vise ball 20 and crown 30 may be modified so long as the functional characteristics of the present invention are maintained, specifically the ability of the present invention to rotate into a plurality of positions and be releasably secured therein. Also, the size and shape of the attachment plate 24 can be modified to accommodate a diverse range of objects, as the precise nature by which objects are supported by the vise ball 20 of the present invention is not critical and, in fact, numerous types of securement devices are known in the prior art which may be used with the vise 10 of the present invention. Finally, the size, shape and construction materials used of and with the present invention may be modified and/or changed so long as the functional characteristics are not destroyed or modified to render the invention inoperable for its intended purposes.

There has thus been shown and described a multi-directional swivel vise which accomplishes at least all of its intended objectives.

I claim:

1. A multi-position swivel vise comprising:
   a base structure including a base plate, at least two upwardly extending legs and a shoulder plate mounted atop said at least two upwardly extending legs, said shoulder plate including a central hole formed therethrough;
   a generally spherical vise ball movably and rotatably supported on said base structure;
   a crown mounted on said base structure above said vise ball;
   jack means mounted on said base structure below said vise ball, said jack means operative to elevate said vise ball into a contact position in contact with said crown such that said vise ball is releasably immobilized via frictional contact with said crown.

2. The multi-position swivel vise of claim 1 further comprising a vise ball support cylinder mounted within said central hole of said shoulder plate and extending generally concentrically therewith, said vise ball support cylinder operative to support said vise ball when said vise ball is in a rest position free of engagement by said jack means.

3. The multi-position swivel vise of claim 2 further comprising a ball cradle slidably mounted within said vise ball support cylinder, said ball cradle including an upper surface constructed of a generally high frictional coefficient material for frictionally secure said vise ball thereon, and a lower surface constructed of a rigid metal material for engagement by said jack means.

4. The multi-position swivel vise of claim 1 wherein said vise ball further comprises a radially outwardly extending shaft mounted thereon and an attachment plate mounted adjacent the outer end of said shaft, said attachment plate operative to support objects to be worked on thereon.

5. The multi-position swivel vise of claim 1 wherein said crown comprises at least one support strut mounted on and extending upwards from said shoulder plate and a gripping ring mounted atop said at least one support strut, said gripping ring including a gap formed therein, said gripping ring substantially encircling said vise ball at a height approximately three-fourths of the height of said vise ball.

6. The multi-position swivel vise of claim 5 wherein said gripping ring includes a curved and angled inner face adapted to generally fit and conform to the surface curvature of said vise ball such that as said inner face of said gripping ring and said surface of said vise ball frictionally engage one another upon said jack means moving said vise ball upwards, the frictional force is large and prevents rotation of said vise ball within said crown.

7. The multi-position swivel vise of claim 1 wherein said jack means comprises an hydraulic jack having at least one actuating foot pedal operatively connected to it, said actuating foot pedal operative to extend said hydraulic jack upwards thus elevating said vise ball into frictional engagement with said crown thereby securing and preventing said vise ball from moving within said crown and a release pedal operative to release said hydraulic jack thus lowering said vise ball and permitting rotation of said vise ball within said crown.

8. An multi-position swivel vise for supporting objects thereon in fixed positions, said swivel vise comprising:
   a base structure including at least one support leg and a vise ball support means including a jack means pass-through opening, said vise ball support means mounted on an upper section of said support leg;
   a vise ball movably and rotatably supported on said vise ball support means;
   a crown mounted on said base structure above said vise ball, said crown including a gripping ring mounted above and encircling said vise ball;
   jack means mounted on said base structure below said vise ball support means and extending upwards through said jack means pass-through opening to contact said vise ball, said jack means operative to elevate said vise ball into a contact position in contact with said gripping ring such that said vise ball is releasably immobilized via frictional contact with said gripping ring.

9. A multi-position swivel vise comprising:
   a base structure;
   a generally spherical vise ball movably and rotatably supported on said base structure;
   a crown mounted on said base structure above said vise ball;
   an hydraulic jack having an actuating means operatively connected to it, said actuating means operative to extend said hydraulic jack upwards thus elevating said vise ball into frictional engagement with said crown thereby securing and preventing said vise ball from moving within said crown and said actuating means further operative to release said hydraulic jack thus lowering said vise ball and permitting rotation of said vise ball within said crown.

\* \* \* \* \*